United States Patent [19]

Baker et al.

[11] 3,829,056
[45] Aug. 13, 1974

[54] APPARATUS FOR FREEZING ICE BODIES
[75] Inventors: Cecil J. Baker, Newburgh, Ind.; Leo G. Beckett, Henderson, Ky.
[73] Assignee: Whirlpool Corporation, Benton Harbor, Mich.
[22] Filed: June 12, 1972
[21] Appl. No.: 261,948

[52] U.S. Cl............. 249/121, 220/31 S, 229/29 M, 249/69, 249/126
[51] Int. Cl............................................. B28b 7/24
[58] Field of Search............. 249/121, 126, 69, 127, 249/129, 70, 132, 133, 203, 130, 131; 220/97 D, 97 F, 31 S; 229/29 M

[56] References Cited
UNITED STATES PATENTS

| 3,021,695 | 2/1962 | Voigtmann | 249/127 |
| 3,145,896 | 8/1964 | Reifers et al. | 229/29 M X |
| 3,243,838 | 4/1966 | Blumberg | 220/31 S X |
| 3,328,831 | 7/1967 | Fiore, Jr. | 220/31 S |
| 3,393,444 | 7/1968 | Peters et al. | 220/31 S X |
| 3,414,229 | 12/1968 | Norberg | 249/121 |
| 3,497,908 | 3/1970 | Zamarra | 220/31 S X |

Primary Examiner—J. Spencer Overholser
Assistant Examiner—DeWalden W. Jones
Attorney, Agent, or Firm—Hofgren, Wegner, Allen, Stellman & McCord

[57] ABSTRACT

An apparatus for freezing ice bodies having a freezing tray and a separable cover connected thereto by improved hinge means and with the cover having edge openings permitting the circulation of subfreezing air beneath the cover and across the surface of water in the freezing tray molds.

6 Claims, 9 Drawing Figures

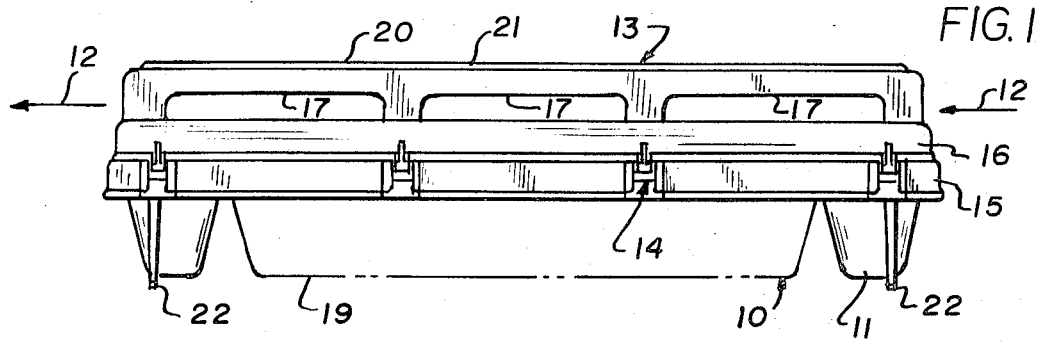
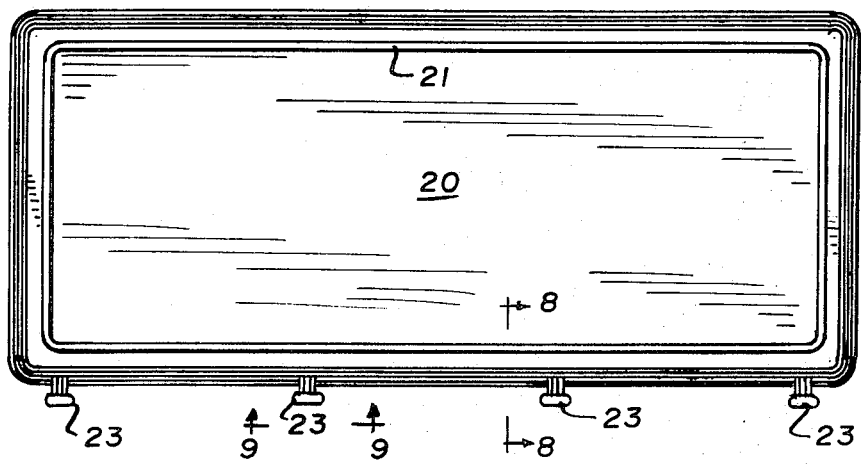
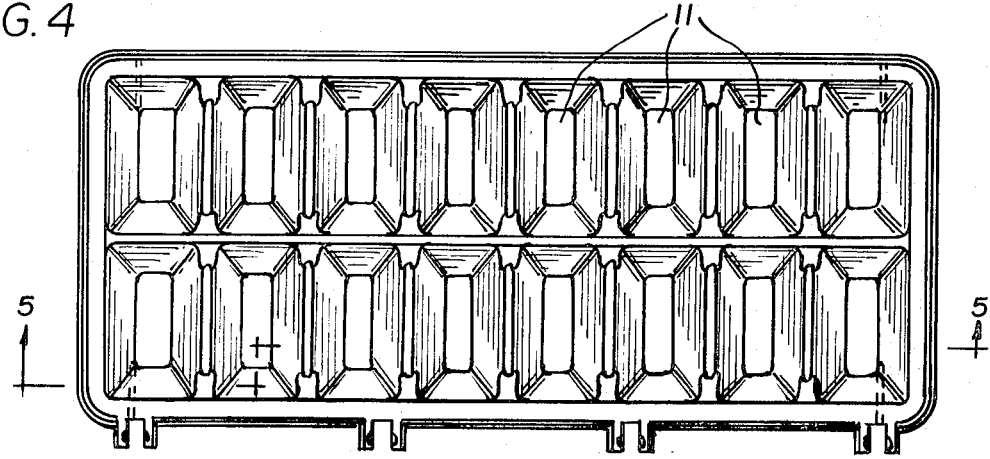
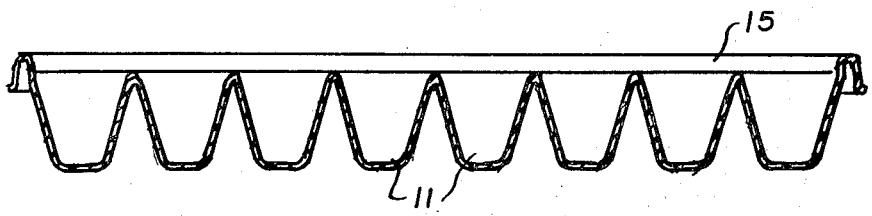

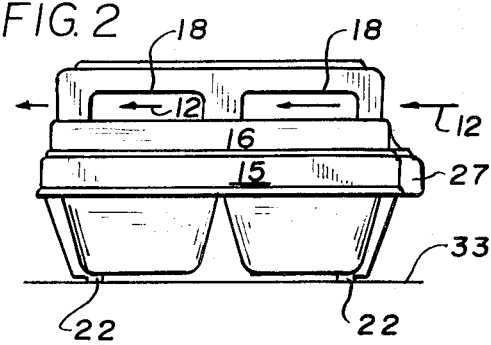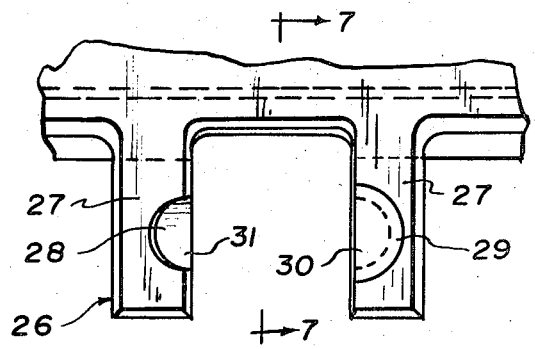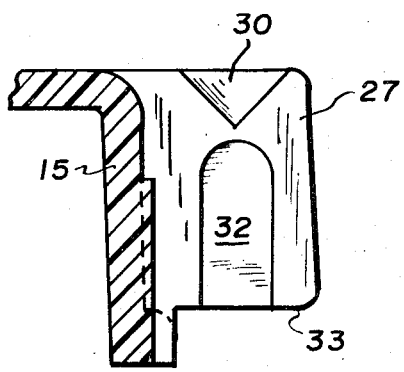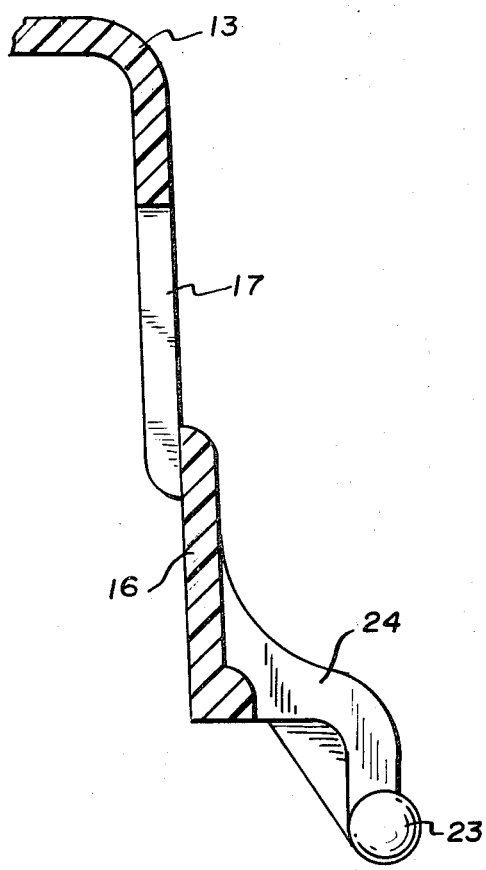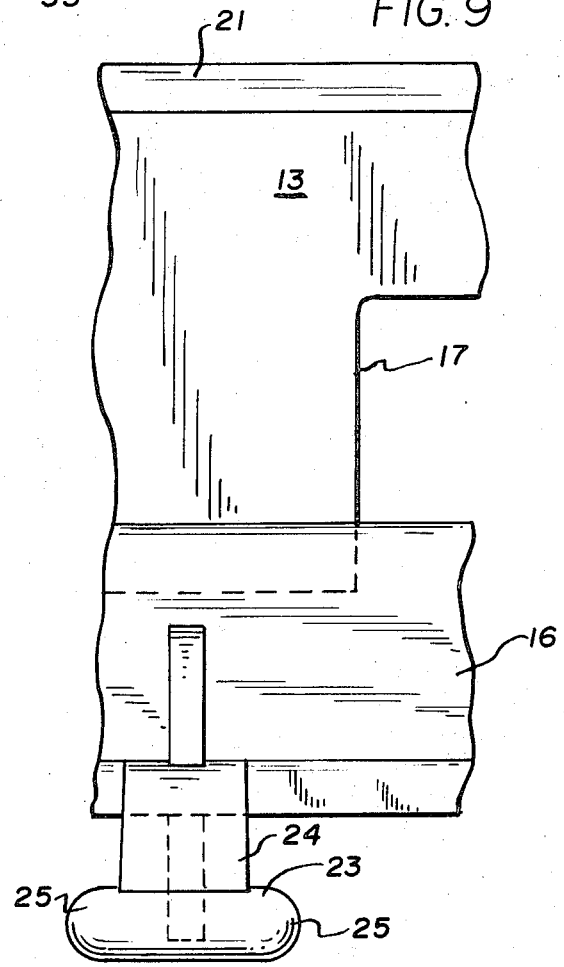

3,829,056

APPARATUS FOR FREEZING ICE BODIES

BACKGROUND OF THE INVENTION

This invention relates to an apparatus for freezing ice bodies having a freezing tray with a plurality of molds for forming ice bodies, a cover releasably connected to the tray adapted to extend over the molds both during freezing and during harvesting of ice bodies from the molds and permitting stacking of a plurality of the tray and cover combinations with the cover having edge rim openings for the circulation of subfreezing air through the closed cover and over the surface of water in the molds.

The most pertinent references of which the applicant is aware are Nigro U.S. Pat. No. 3,135,101 and Ewers U.S. Pat. No. 3,443,785 each disclosing covered ice cube tray but neither embody the features of the invention described and claimed hereinafter.

SUMMARY OF THE INVENTION

The apparatus for freezing ice bodies of this invention comprises the freezing tray with the plurality of molds for forming the ice bodies and a removable cover hinged thereto which when closed permits stacking of a number of the apparatus in vertical stacks, permits inversion of the assembly to harvest ice bodies from the molds into the cover, permits storing frozen ice bodies in the open cover out of contact with water in the freezing tray and includes improved hinge means permitting separation of the cover from the tray when desired.

In the preferred apparatus both the cover and the tray are twistable by an applied torque force in harvesting the ice bodies from the tray into the cover and the hinges are spaced sufficiently apart so as not to interfere with this twisting.

In addition the invention includes an improved hinge structure with guideways for aiding in attaching the cover to the tray and for releasing it from the tray both in a snap action.

In a preferred structure the cover is provided with an upstanding raised bead adjacent its periphery that cooperates with means on the tray such as downwardly projecting corner feet for preventing sliding dislodgment of one tray stacked on top of the other.

BRIEF DESCRIPTION OF THE DRAWINGS

FIG. 1 is a side elevation of an assembled tray and cover embodying the apparatus of the invention.

FIG. 2 is an end view of the apparatus of FIG. 1.

FIG. 3 is a plan view of the cover only of the apparatus.

FIG. 4 is a plan view of the freezing tray portion of the apparatus.

FIG. 5 is a sectional view taken substantially along line 5—5 of FIG. 4.

FIG. 6 is an enlarged fragmentary plan view of a portion of one of the plurality of hinges.

FIG. 7 is a sectional view taken substantially along line 7—7 of FIG. 6.

FIG. 8 is an enlarged sectional view taken along line 8—8 of FIG. 3.

FIG. 9 is a fragmentary enlarged side elevational view taken from line 9—9 of FIG. 3.

DESCRIPTION OF THE PREFERRED EMBODIMENT

The apparatus for freezing ice bodies embodying the invention and illustrated in the accompanying drawings comprises a freezing tray 10 having a plurality of cube-shaped molds 11 for forming corresponding ice bodies when subjected to a subfreezing air stream illustrated by the arrows 12 in FIGS. 1 and 2.

Releasably attached to the tray 10 is a cover 13 that is connected thereto at a plurality of edge located hinges 14 that permits opening of the cover to any degree desired to and through 180° for exposing the molds 11. The tray 10 and cover 13 have edge means forming rims 15 and 16, respectively, that contact each other when closed as illustrated in FIGS. 1 and 2.

The cover rim 16 is provided with openings 17 at the sides and openings 18 at the ends that permit the circulation of subfreezing air indicated at 12 through the closed cover and over the surfaces of water held in the molds 11 during the freezing operation. The circulation of subfreezing air in forming ice bodies is quite common in ice body freezers.

The tray and cover have outer surfaces 19 and 20 that are substantially coplanar when the tray and cover have been opened 180° from the closed position of FIGS. 1 and 2 so that the assembly when opened can be supported on a common plane surface.

The cover 13 at the top outer surface 20 thereof is provided with a raised peripheral bead 21 that facilitates stacking of a plurality of the trays in a vertical stack when the covers are closed. The bead 21 on each stack cover cooperates with means 22 in the form of corner feet in the embodiment illustrated that will be retained within the confines of the bead 21 during stacking to prevent sideways dislodgment of the stacked trays.

In the embodiment illustrated particularly at FIGS. 6–9 each hinge 14 comprises a cross pin 23 mounted on one of the tray and cover on a bracket 24 attached thereto. In the illustrated embodiment the pins 23 and their corresponding brackets 24 are mounted on the cover 13. The pins 23 have rounded ends 25 that project laterally of their bracket 24 and engage a socket 26 on the other of the cover and tray. Thus in the embodiment illustrated with the pins 23 on the cover the sockets 26 are on the tray.

Each socket 26 comprises a pair of spaced, substantially parallel sides or walls 27 having facing recesses 28 and 29 that removably receive the rounded ends 25 of a pin. One 29 of each pair of recesses 28 and 29 is provided with a sloped guideway 30 in the form of a funnel while the other 28 recess is provided with a rounded bottom 31. The recess portion 32 beneath the guideway 30 as illustrated in FIG. 7 continues through the bottom 33 of its wall 27. The rounded bottom 31 of the opposite recess 28, however, terminates short of its wall as illustrated in FIG. 6. Thus with this arrangement the cover and tray may be assembled in the arrangement illustrated in FIGS. 1 and 2 by a snap action of the cross pins downwardly in their recesses and can be separated as illustrated in FIGS. 3 and 4 by a snap in the opposite direction.

Both the tray 10 and the cover 13 are flexible such as being made of solid polypropylene. By being flexible the ice bodies may be loosened from the tray by twisting torque of the closed cover and tray in the customary manner. The plurality of hinges 14 are spaced apart in sufficient distance and are of small extent so that they do not interfere with this twisting. Preferably the cover 13 and tray 10 are inverted prior to or during the application of twisting torque so that the loosened ice bodies can fall freely from the plurality of molds 11 into the cover 13. It is to be noted that the openings 17 at the sides and openings 18 at the ends of the cover 13 are dimensioned so as to preclude the harvested ice bodies from passing through the openings and hence fall from the cover 13.

The apparatus of this invention has a number of very important advantages. The cover 13 permits ice bodies to be harvested from the molds 11 without chance of spillage or loss of ice bodies. Further, if desired the ice bodies may be stored in cover 13 free of the molds 11 to preclude the ice bodies from refreezing in the molds 11. The openings 17 and 18 by aiding the circulation of air across the tops of the bodies of water in the molds aids freezing. The closed trays may be stacked one on top of the other and the combination of the cover bead 21 and tray feet 22 prevents accidental sideways dislodgment. When the cover is opened through 180° from the position shown in FIGS. 1 and 2 the coplanar supporting surfaces on the cover and tray permits their retention on a flat supporting surface such as the surface 33 of FIG. 2. This permits storing ice bodies in the open cover while the tray is used for producing additional ice bodies.

Having described my invention as related to the embodiment shown in the accompanying drawings, it is my intention that the invention be not limited by any of the details of description, unless otherwise specified, but rather be construed broadly within its spirit and scope as set out in the appended claims.

We claim:

1. Apparatus for freezing ice bodies, comprising: a freezing tray having a plurality of molds for forming ice bodies; a separable cover releasably connected to said tray at a plurality of edge located hinges permitting opening of the cover to expose said molds, said cover and tray having edge rims contacting each other when closed; and air vent opening means on opposite sides of said cover rim for providing circulation of subfreezing air within the closed cover across the surfaces of water in said molds for aiding in the freezing.

2. The apparatus of claim 1 wherein said tray and cover have substantially coplanar outer supporting surfaces when opened to 180°.

3. The apparatus of claim 1 wherein said cover has a top with the cover edge rim that contains said opening means being at substantially right angles to the top.

4. The apparatus of claim 1 wherein each said hinge comprises a single cross pin mounted on one of the tray and cover having rounded projecting opposite ends and a socket on the other of the tray and cover having a pair of spaced side walls with facing recesses removably receiving the rounded ends, one of the side walls in each pair having at one end a shaped guideway for guiding the pin into locking position in its side walls by a resilient snap action.

5. The apparatus of claim 1 wherein both said tray and cover are flexible for torque twisting in releasing the ice bodies and the hinges are spaced apart so as to preclude interference with the twisting.

6. The apparatus of claim 1 wherein said tray and cover have substantially coplanar outer supporting surfaces when opened to 180°, said cover having a top with the cover edge rim that contains said opening means being at substantially right angles to the top.

* * * * *